United States Patent
Jiang et al.

(10) Patent No.: US 8,687,527 B2
(45) Date of Patent: Apr. 1, 2014

(54) LOW COMPLEXITY LINK ADAPTATATION FOR LTE/LTE-A UPLINK WITH A TURBO RECEIVER

(75) Inventors: Meilong Jiang, Plainsboro, NJ (US);
Narayan Prasad, Wyncote, PA (US);
Guosen Yue, Plainsboro, NJ (US);
Sampath Rangarajan, Bridgwater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 304 days.

(21) Appl. No.: 13/234,885

(22) Filed: Sep. 16, 2011

(65) Prior Publication Data
US 2012/0069757 A1    Mar. 22, 2012

Related U.S. Application Data

(60) Provisional application No. 61/383,378, filed on Sep. 16, 2010.

(51) Int. Cl.
*H04B 7/005*  (2006.01)
*H04B 1/00*  (2006.01)

(52) U.S. Cl.
USPC .......................................... 370/278; 375/144

(58) Field of Classification Search
None
See application file for complete search history.

(56) References Cited

U.S. PATENT DOCUMENTS

| | | | |
|---|---|---|---|
| 2008/0069262 A1* | 3/2008 | Prasad et al. | 375/267 |
| 2008/0188190 A1* | 8/2008 | Prasad et al. | 455/114.3 |
| 2010/0002598 A1* | 1/2010 | Pan et al. | 370/252 |
| 2010/0195594 A1* | 8/2010 | Seo et al. | 370/329 |
| 2010/0322176 A1* | 12/2010 | Chen et al. | 370/329 |
| 2011/0033001 A1* | 2/2011 | Roh et al. | 375/260 |
| 2011/0249590 A1* | 10/2011 | Blankenship et al. | 370/252 |
| 2012/0051248 A1* | 3/2012 | Roh et al. | 370/252 |
| 2012/0106388 A1* | 5/2012 | Shimezawa et al. | 370/252 |

\* cited by examiner

*Primary Examiner* — Eunsook Choi
(74) *Attorney, Agent, or Firm* — Joseph Kolodka; Akitaka Kimura

(57) ABSTRACT

An inventive method for link adaptation for an LTE/LTE-A uplink with a turbo SIC receiver includes the steps of determining a precoding matrix index PMI and rank index RI selection for an LTE/LTE-A uplink when precoding of the uplink is enabled, responsive to channel state information of a subcarrier in the uplink; determining a decoding order for codewords in the uplink i) when the precoding of the uplink is not enabled and ii) if needed when the precoding of the uplink is enabled; performing modulation and coding scheme MCS assignment for the uplink based on a hard decision successive interference cancellation SIC rule (without intra-CW cancellation) or a partial hard decision successive interference cancellation SIC rule (with intra-CW cancellation), responsive to the determined PMI and RI selection; and influencing data transmission in the uplink responsive to the MCS assignment for detection by a turbo SIC receiver.

12 Claims, 4 Drawing Sheets

Table 1: $\beta_r$ settings for rank R=2

| Decoding order / Currently detecting layer | CW1 first (layer 1) | CW2 first (layer 2) |
|---|---|---|
| r = 1 | $\beta_r = [1\ 0]$ | $\beta_r = [1\ 0]$ |
| r = 2 | $\beta_r = [0\ 1]$ | $\beta_r = [1\ 1]$ |

Table 2: $\beta_r$ settings for rank R=3

| Decoding order / Currently detecting layer | CW1 first (layer 1) | CW2 first (layer 2,3) |
|---|---|---|
| r = 1 | $\beta_r = [1\ 1\ 1]$ | $\beta_r = [1\ 0\ 0]$ |
| r = 2 | $\beta_r = [0\ 1\ 1]$ | $\beta_r = [1\ 1\ 1]$ |
| r = 3 | $\beta_r = [0\ 2\ 1]$ | $\beta_r = [1\ 2\ 1]$ |

Table 3: $\beta_r$ settings for rank R=4

| Decoding order / Currently detecting layer | CW1 first (layer 1,2) | CW2 first (layer 3,4) |
|---|---|---|
| r = 1 | $\beta_r = [1\ 1\ 1\ 1]$ | $\beta_r = [1\ 1\ 0\ 0]$ |
| r = 2 | $\beta_r = [2\ 1\ 1\ 1]$ | $\beta_r = [2\ 1\ 0\ 0]$ |
| r = 3 | $\beta_r = [0\ 0\ 1\ 1]$ | $\beta_r = [1\ 1\ 1\ 1]$ |
| r = 4 | $\beta_r = [0\ 0\ 2\ 1]$ | $\beta_r = [1\ 1\ 2\ 1]$ |

FIG. 6

| MCS index | MCS | TBS (bits) | $SINR_{th,q}(dB)$ target BLER=0.1 | $SINR_{th,q}(dB)$ Maximum rate | Effective rate $R_{eff}$ (b/s/Hz) |
|---|---|---|---|---|---|
| 0 | QPSK-1/3 | 768 | -0.5 | -0.5 | 0.67 |
| 1 | QPSK-1/2 | 768 | 1.8 | 1.52 | 1.0 |
| 2 | QPSK-2/3 | 512 | 3.9 | 3.07 | 1.3 |
| 3 | QPSK-3/4 | 576 | 4.85 | 4.81 | 1.5 |
| 4 | QPSK-5/6 | 640 | 5.9 | 5.9 | 1.67 |
| 5 | 16QAM-1/2 | 768 | 7.25 | 7.12 | 2.0 |
| 6 | 16QAM-2/3 | 512 | 9.8 | 9.59 | 2.67 |
| 7 | 16QAM-3/4 | 576 | 11.1 | 11.05 | 3.0 |
| 8 | 16QAM-5/6 | 640 | 12.3 | 12.24 | 3.3 |
| 9 | 64QAM-2/3 | 512 | 15 | 14.77 | 4.0 |
| 10 | 64QAM-3/4 | 576 | 16.5 | 16.44 | 4.5 |
| 11 | 64QAM-5/6 | 640 | 17.8 | 17.82 | 5.0 |

Table 4: SINR thresholds for MCS selection based on AWGN performance

FIG. 7

LOW COMPLEXITY LINK ADAPTATATION FOR LTE/LTE-A UPLINK WITH A TURBO RECEIVER

This application claims the benefit of the following U.S. Provisional Application No. 61/383,378, entitled, " Low complexity link adaptation for LTE/LTE-A uplink with a turbo receiver", filed Sep. 16, 2010, of which the contents is incorporated herein by reference.

BACKGROUND OF THE INVENTION

The present invention relates generally to broadband and wireless communications and more particularly to link adaptation for LTE/LTE-A uplink with a turbo receiver.

Closed-loop link adaptation enabled by adaptive modulation and coding scheme (MCS), rank adaptation and precoding matrix index (PMI) selection are known to be an effective technique to further enhance the performance of wireless systems with multiple antennas. For the systems with linear multiple input multiple output (MIMO) receivers, a post-processing signal-to-interference-plus-noise-ratio (SINR) of the equivalent scalar additive white Gaussian noise (AWGN) channel is available. MCS assignment and PMI/Rank selection can easily be done based on this effective post-processing SINR. However, the rate adaption (MCS assignment), rank adaptation and PMI selection for the systems equipped with non-linear receivers such as turbo MMSE-SIC (minimum mean square error—successive interference cancelation) is non-trivial since there is no explicit effective SINR expression for the turbo SIC output. The potential gains enabled by advanced receivers cannot be realized if the post-processing SINRs assuming linear MIMO receivers are used for closed-loop link adaptation.

One simple but conservative rate adaptation scheme is to determine MCS, PMI and rank based on linear minimum mean square error (MMSE) SINRs. This method is simple but too conservative to sufficiently claim the performance gain provided by advanced receivers.

In another prior disclosed technique, a Gaussian approximation method is proposed to predict iterative turbo MMSE-SIC performance. This method assumes that the residual interference seen by each distinct codeword after soft-cancelation at each iteration is independent and Gaussian. Further, it relies on a one-dimensional look-up table (LUT) to compute the variance of this residual interference. The effective SINR can then be analytically computed based on the channel realization and the residual interference variance. However, for this method a big mismatch between the predicted performance and actual performance is observed. In addition, the rate assignment has very high complexity and low flexibility since the, MCS assignments for different codewords are coupled.

Accordingly, there is a need for improved adaptation for an LTE/LTE-A uplink in a wireless communication system.

BRIEF SUMMARY OF THE INVENTION

The present invention is directed to a low complexity and efficient closed-loop link adaptation scheme including rate assignment, rank adaptation and PMI selection for the long term evolution/long term evolution-advanced (LTE/LTE-A) uplink equipped with the advanced turbo SIC receivers.

An inventive method for link adaptation for an LTE/LTE-A uplink with a turbo SIC receiver includes the steps of determining a precoding matrix index PMI and rank index RI selection for an LTE/LTE-A uplink when precoding of the uplink is enabled, responsive to channel state information of a subcarrier in the uplink; determining a decoding order for codewords in the uplink i) when the precoding of the uplink is not enabled and ii) if needed when the precoding of the uplink is enabled; performing modulation and coding scheme MCS assignment for the uplink based on a hard decision successive interference cancellation SIC rule (without intra-CW cancellation) or a partial hard decision successive interference cancellation SIC rule (with intra-CW cancellation), responsive to the determined PMI and RI selection; and influencing data transmission in the uplink responsive to the MCS assignment for detection by a turbo SIC receiver.

In an exemplary embodiment of the invention, the inventive method for link adaptation for an LTE/LTE-A uplink with a turbo SIC receiver i) determining a precoding matrix index PMI and rank index RI selection for an LTE/LTE-A uplink when precoding of the uplink is enabled, responsive to channel state information of a subcarrier in the uplink, the PMI and RI being determinable for both sub-band precoding and wideband precoding with codeword decoding being jointly determinable with PMI and RI selection; ii) determining a decoding order for codewords in the uplink a) when the precoding of the uplink is not enabled and b) if needed when said precoding of said uplink is enabled, responsive to step i), the decoding order being one of enforced from an upper layer by a scheduler or determined on-the-fly, in case of a proportional fairness the scheduler an ordering being to set the decoding order as a reverse order of weights of the proportional fairness or the decoding order being jointly determined with the determining of the PMI and rank selection; iii) selecting modulation and coding scheme MCS indices on the uplink according to a hard decision successive interference cancellation signal-to-interference-noise-ratio SIC SINR or a partial hard decision SIC SINR, responsive to step ii), for a codeword in the uplink decoded first, said MCS being assigned according to its minimum mean square error MMSE-SINR and for a codeword decoded second, the MCS index being assigned according to its single-user SINR; and iv) conveying the MCS indices to scheduling at a base station of the uplink for being applied to data transmission in the uplink.

These and other advantages of the invention will be apparent to those of ordinary skill in the art by reference to the following detailed description and the accompanying drawings.

BRIEF DESCRIPTION OF THE DRAWINGS

FIG. 6 shows TABLES 1, 2 and 3 for layer dependent vectors settings for ranks R=2, R=3 and R=4, respectively, in accordance with the invention; and FIG. 7 shows TABLE 4 SINR thresholds for MCS selection based on AWGN performance, in accordance with the invention.

DETAILED DESCRIPTION

The present invention is directed to a low complexity and efficient closed-loop link adaptation scheme including rate assignment, rank adaptation and PMI selection for the long term evolution/long term evolution-advanced (LTE/LTE-A) uplink equipped with the advanced turbo SIC receivers.

The inventive technique takes into account the effect of the SIC receiver and resorts to the SINRs corresponding to an ordered hard-decision SIC receiver. For instance, in an uplink with two users/codewords, for the user/codeword decoded first, an MCS is assigned according to its MMSE-SINR (subject to a target block error rate (BLER) constraint). For the user codeword decoded second, the MCS is assigned according to its single-user SINR (i.e., the SINR computed after assuming perfect cancelation of the codeword transmitted by the other user). Both SINRs can be computed using closed-form expressions that depend on the estimates of the users' instantaneous channel states, their transmit powers and the noise variance. The inventive technique can be extended to the system with more than 2 users/codewords. Similarly, PMI and rank indication (RI) are determined based on the ordered hard-decision SIC receiver.

1. Turbo SIC Receiver

Figure 1:
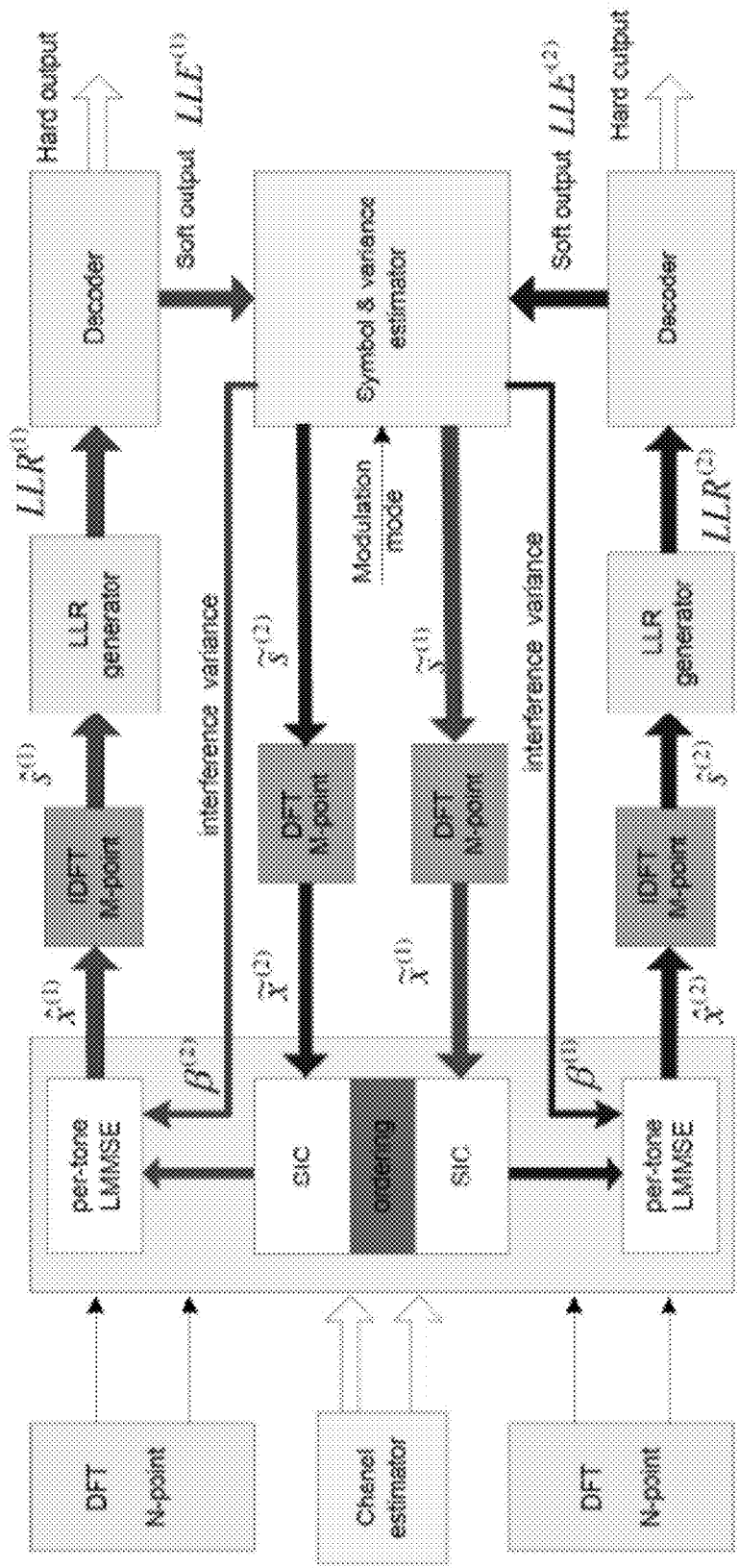
FIG. 1 depicts an exemplary (turbo successive interference cancellation) turbo-SIC receiver for a two-codeword uplink, in which the present invention can be employed.

As shown in FIG. 1, the principal operation of the turbo SIC receiver is an iterative process, in which feedback information such as the estimated symbol mean ($\tilde{x}$) and variance ($\beta$) obtained from the soft output of the decoder is incorporated into the equalization process. In that way, the performance is improved through an iterative exchange of extrinsic information between the equalizer and the decoder. The iterative process is configured to reduce the inter-symbol interference (ISI), multi-stream interference, and noise. The invention is a low-complexity rate adaptation technique for a system with a turbo-SIC multiple-input multiple-output MIMO receiver, such as the exemplary configuration shown in FIG. 1.

2. Link Adaptation for LTE/LTE-A Uplink with a Turbo SIC MIMO Receiver

Figure 2:
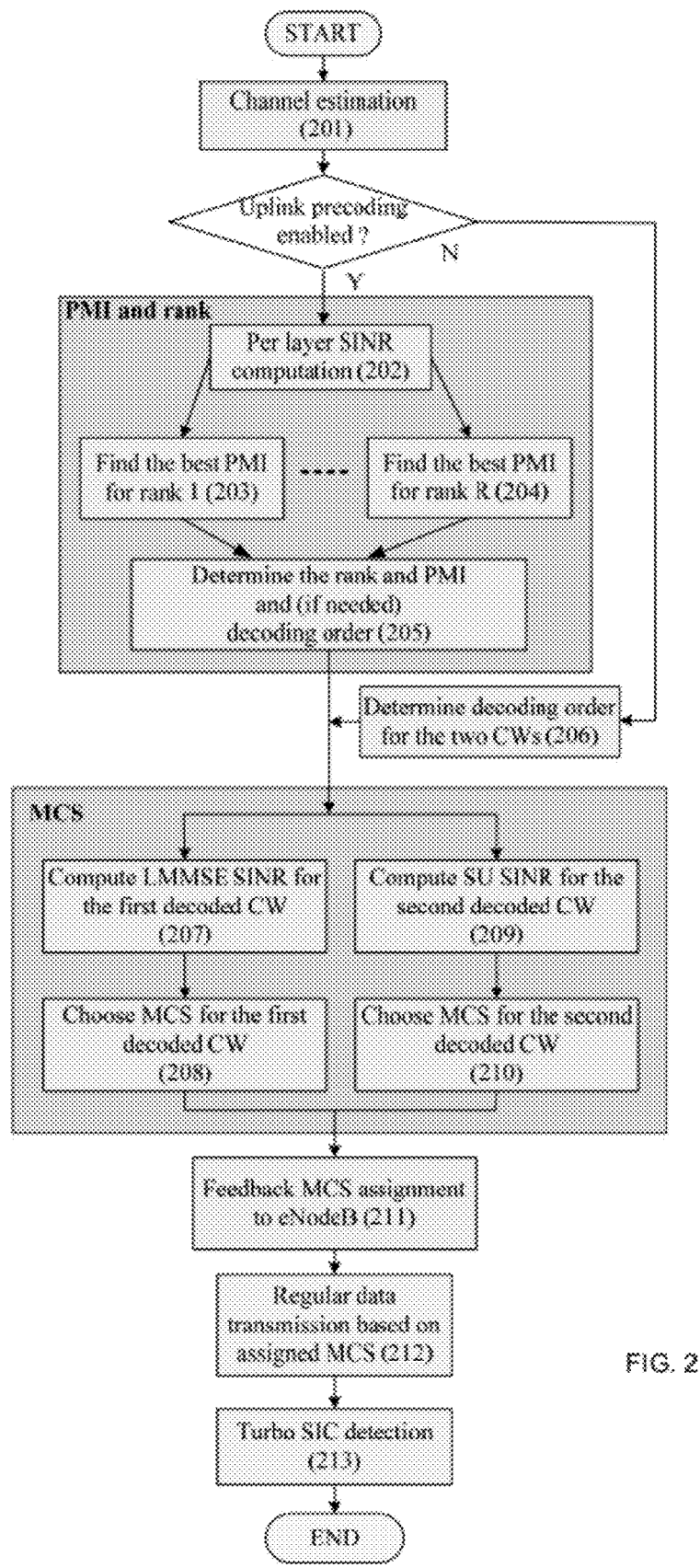
FIG. 2 is a flow diagram of a low complexity link adaptation for LTE/LTE-A uplink, exemplarily shown as applied to a two-stream codeword turbo receiver, in accordance with the invention.

The inventive link adaptation is based on a discrete Fourier transform-spread-orthogonal frequency division multiplexing (DFT-Spread-OFDM). As an illustrative example, the link adaptation flow for two-codeword uplink transmission is shown in FIG. 2. The inventive technique can be applied to a system with two single-stream user equipments UEs (multi-user single-input-multi-output: MU SIMO) in an LTE uplink or a single user (SU)-MIMO system with two-codeword transmission in LTE-A uplink. Note that the inventive technique can also be applied to OFDM-based systems and be extended to the case with more than two codewords (CW).

First 201, channel state information (CSI) of the m-th subcarrier $H_m$ is obtained. For the LTE uplink, each CW spans one DFT block (M tones per block) and multiple OFDM symbols.

Second, the CW decoding order 206 can be enforced from an upper layer by the scheduler or determined on-the-fly. In the case of proportional fairness (PF) scheduler, a practical ordering is to set the decoding order as the reverse order of the PF weights (for example, the codeword with the lowest PF weight is decoded first and so on). Otherwise, the CW decoding order can be jointly determined with PMI/RI selection.

Third, when the uplink precoding is activated such as in the case of SU-MIMO, the precoding matrix index (PMI) and rank index (RI) can be determined 202-205 for both sub-band precoding and wideband precoding, as given in the discussion below (3. Rank and PMI Selection). The CW decoding order can also be optimized in this step based on weighted sum layer capacity.

Next, MMSE_SINR $\gamma_{mmse}$ for the $1^{st}$ decoded CW and SU_SINR $\gamma_{su}$ for the $2^{nd}$ decoded CW are computed respectively, as presented below (4. Rate Matching).

Lastly, MCS selection 207-210 is performed according to the hard-decision SIC SINRs. Specifically, for the user/CW decoded first, MCS is assigned according to its MMSE-SINR (subject to a target BLER constraint) 207, 208. For the user/CW decoded second, MCS is assigned according to its single-user SINR (i.e., the SINR computed after assuming perfect cancelation of the codeword transmitted by the other user) 209, 210.

After the MCS indices are chosen for both UEs, the MCS indices shall be conveyed to the scheduling module at the Base Station/eNodeB 211 and applied to the regular data transmission 212.

At the receiver, turbo-SIG reception is performed 213, as shown in FIG. 1.

3. Rank and PMI Selection

Figure 3:
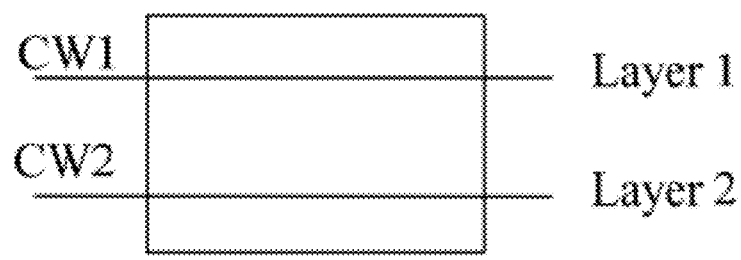
FIG. 3 is a diagram of codeword-to-layer mapping for uplink precoding in the case of two codewords and two layers, in accordance with the invention.
Figure 4:
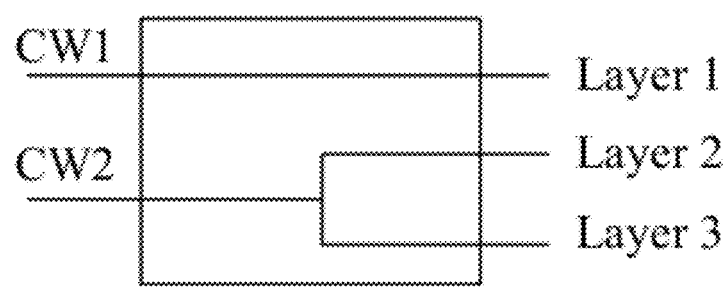
FIG. 4 is diagram of codeword-to-layer mapping for uplink precoding in the case of two codewords and three layers, in accordance with the invention.
Figure 5:
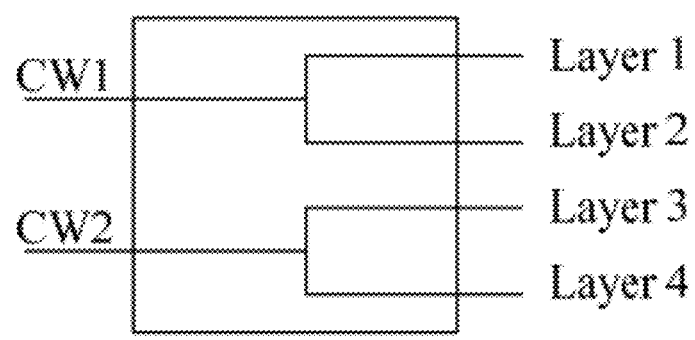
FIG. 5 is a diagram of codeword-to-layer mapping for uplink precoding in the case of two codewords and four layers, in accordance with the invention.

In the case that uplink precoding is enabled, a codeword-to-layer mapping operation is needed before the precoding. Shown in FIGS. 3, 4 and 5 are illustrations of typical rules for two CWs and up to four layers mapping.

3.1 Narrowband (Sub-Band) Precoding

For a sub-band comprising of a few contiguous tones, the precoding matrix index (PMI) for any given rank R (equal to the number of transmission layers) can be selected by considering the centre tone in the sub-band (say the m-th tone) as $$PMI_m = \arg\max_{q\in[1,\ldots,Q]} \sum_{r=1}^{R} \varphi(r)\log_2(1 + SINR_{m,q}^{(r)}),$$

where $\phi(r)$ denotes a layer-dependent weighting factor (for example $\phi(r)=1$ for equal weighting) and $SINR_{m,q}^{(r)}$ the pre-DFT SINR of the r-th layer at the m-th tone upon choosing the q-th PMI and it is given by $$SINR_{m,q}^{(r)} = w_{m,q}^{(r)\dagger}\left(I + \sum_{j=1,j\neq r}^{R} w_{m,q}^{(j)} w_{m,q}^{(j)\dagger}\right)^{-1} w_{m,q}^{(r)}.$$

Here $\{\omega_{m,q}^{(j)}\}$ are the equivalent channel vectors weighted by a layer-dependent $\beta_r$ vector indicating the turbo SIC effect, i.e., $$\omega_{m,q}^{(r)}=\sqrt{\beta_r(r)}H_m g_q^{(r)}, \text{ and}$$

$$\omega_{m,q}^{(j)}=\sqrt{\beta_r(j)}H_m g_q^{(j)}, j\neq r\in[1,\ldots,R],$$

$g_p^{(r)}$ is the r-th column of the selected q-th precoding matrix $G(q)=[g_q^1, \ldots g_q^{(R)}]\in C^R T\times R$. Q denotes the size of the codebook (which can be rank-specific). And $\beta_r(j)$ is the j-th element of the $\beta_r$ vector associated with the r-th layer, which is defined in Tables 1-3, shown in FIG. 6. When the turbo SIC receiver is abstracted by a hard-decision SIC (without intra-CW cancellation), the intra-CW error variance is set to a hard value 1 ($\beta_\tau=1$); When the turbo SIC receiver is abstracted by a partial hard-decision SIC (with intra-CW cancellation), the intra-CW error variance $\beta_\tau$ can be adjusted to a soft value (between 0 and 1) that characterizes inter-CW cancellation effect. $\beta_\tau$ can be determined via offline simulation and a typical example is $\beta_\tau=0.15$.

Note that $H_m G(q) = [H_m g_q^{(1)}, \ldots, H_m g_q^{(R)}]$ is the effective precoded channel matrix associated with the q-th precoding matrix and the m-th tone. Note that the r-th layer is associated with the r-th column of the effective precoded channel matrix. The role of the $\beta_r$ vector associated with the r-th layer is to ensure that when computing the pre-DFT SINR $SINR_{m,q}^{(r)}$, the columns of the effective precoded channel matrix $H_m G(q)$ that are associated with the layers mapped to the other codeword (i.e., the one to which the r-th layer is not mapped) only appear in the argument of the inverse operation if the assumed or given decoding order specifies decoding the codeword to which the r-th layer is mapped first. Furthermore, all columns of the effective precoded channel matrix $H_m G(q)$ other than the r-th column that are associated with the codeword to which the r-th layer is mapped, appear in the argument of the inverse operation.

For any given rank R, a weighted sum rate metric v(R) assuming optimized sub-band PMIs can be defined as $$v(R) = \sum_{r=1}^{R} \varphi(r) \log_2(1 + SINR^{(r)}),$$

where $SINR^{(r)}$ is the post-DFT SINR of the r-th layer given by $$SINR^{(r)} = \frac{\alpha^{(r)}}{1 - \alpha^{(r)}}.$$

$\alpha^{(r)}$ can be computed based on the optimized sub-band PMIs $\{q^*_m\}$ obtained above and is given by $$\alpha^{(r)} = \frac{1}{M} \sum_{m=1}^{M} w_{m,q^*_m}^{(r)\dagger} \left( I + \sum_{j=1}^{R} w_{m,q^*_m}^{(j)} w_{m,q^*_m}^{(j)\dagger} \right)^{-1} w_{m,q^*_m}^{(r)}.$$

The optimized rank index is thus obtained by $$RI = \arg\max_{R \in [1, \ldots, R_{max}]} v(R).$$

where $R_{max}$ denotes the maximum supported rank.

Based on the hard-decision SIC rule, the layer dependent $\beta_r$ vector is defined in below tables for different ranks and decoding orders of the two CWs. r corresponds to the current layer under consideration.

Notice that the PMI and RI obtained above assumes a given decoding order. If the decoding order is not enforced by upper layer, the final CW decoding order (and corresponding optimal PMIs and RI) can be determined by selecting the order which gives highest optimized weighted sum layer capacity.

3.2 Wideband Precoding

In the case of wideband precoding, the same precoding matrix is applied to all sub-bands.

The wideband precoding matrix for R-layer transmission can be selected as $$PMI = \arg\max_{q \in [1, \ldots, Q]} \sum_{r=1}^{R} \varphi(r) \log_2(1 + SINR_q^{(r)}),$$

where the wideband post-DFT SINR $SINR_q^{(r)}$ for the r-th layer upon selecting the q-th precoding matrix is given by $$SINR_q^{(r)} = \frac{\alpha^{(r)}}{1 - \alpha^{(r)}},$$

and $\alpha^{(r)}$ can be obtained as $$\alpha^{(r)} = \frac{1}{M} \sum_{m=1}^{M} w_{m,q}^{(r)\dagger} \left( I + \sum_{j=1}^{R} w_{m,q}^{(j)} w_{m,q}^{(j)\dagger} \right)^{-1} w_{m,q}^{(r)}.$$

The rank index selection for wideband precoding is same as that obtained in narrowband precoding case except that the $\alpha^{(r)}$ is computed based on the optimized wideband PMI.

Similarly, the wideband PMI and RI obtained here assumes a given decoding order. If further optimization over decoding order is possible, the final CW decoding order (and corresponding optimal PMI and RI) can be determined by selecting the order which gives highest optimized weighted sum layer capacity.

4. Rate Matching 4.1 Obtaining Per Codeword SINR

After per layer SINR $SINR^{(r)}$ is obtained for all layers r=[1, R] based on the selected PMI and RI, per codeword SINR shall be calculated for MCS assignment per stream/CW. Notice that if uplink precoding is not applied, the per layer SINR calculation in Section 3 is still valid by setting $g_q^{(r)}$ to be a binary column vector with the r-th entry being 1 and all other entries being 0.

For R=2 (2-layer) transmission, per codeword SINR is equal to per layer SINR because of the one-to-one mapping and it is given by $$SINR^{(r)} = \frac{\alpha^{(r)}}{1 - \alpha^{(r)}}.$$

where $\alpha^{(r)}$ is explained in Section 3 for both narrowband and wideband precoding.

For R>2, per layer SINR is obtained as $SINR^{(r)}$. Per codeword SINR can be obtained based on the applied codeword-to-layer mapping rule. MIESM based method is used when SINR combining is needed. For example, layer 2 and layer 3 SINR can be combined to obtain CW2 SINR for R=3.

Note that by applying the $\beta_r$ vectors in TABLES 1-3 designed according to the hard-decision SIC rule (with intra-CW error variance set to hard value 1, i.e. $\beta_\tau=1$) or partial hard-decision SIC rule (with intra-CW error variance $\beta_\tau$ set to soft value), we obtain MMSE SINR $\gamma_{mmse}^{(1)}$ for the first decoded CW and SU SINR $\gamma_{su}^{(2)}$ for the second decoded CW.

The final CW SINRs $\gamma_{mmse}^{(1)}$ and $\gamma_{su}^{(2)}$ are used to determine MCS for each codeword.

4.2 MCS Assignment

The proposed MCS selection for the uplink with Turbo SIC receiver is performed according to the following criteria.

For the 1$^{st}$ decoded CW/UE, choose the largest MCS index i* that MMSE SINR $\gamma_{mmse}^{(1)}$ can support, i.e.

$$i^* = \max i.s.t. \gamma_{mmse}^{(1)} \geq SINR_{thr1}(i);$$

For the 2$^{nd}$ decoded CW/UE, choose the largest MCS index j* that SU SINR $\gamma_{su}^{(2)}$ can support, i.e.

$$j^* = \max j.s.t. \gamma_{su}^{(2)} \geq SINR_{thr2}(j);$$

where SINR$_{thr1}$ and SINR$_{thr2}$ are respectively SINR threshold vectors for UE 1's and UE 2's MCS assignment.

5. SINR Threshold Design for MCS Assignment

We obtain two SINR threshold vectors (SINR$_{thr1}$ and SINR$_{thr2}$) for the MCS assignment as listed in TABLE 4, sown in FIG. 7. SINR$_{thr1}$($_i$) is the minimum SINR level that ensures a target block error rate BLER=0.1 (over the scalar additive white Gaussian noise AWGN channel) for the MCS with index i. SINR$_{thr2}$(i) denotes the SINR value at the transition point such that the MCS of index i maximizes the effective throughput R$_{eff}$(1−BLER) for all SINRs in the range of [SINR$_{thr2}$(i), SINR$_{thr2}$(i+1)].

6. Extension to MU-MIMO Case

The proposed link adaption scheme can be directly applied to a system with multiple UEs, where each UE can have multiple streams. The extended system can be viewed as a virtual SU-MIMO system with a larger number of layers and codewords and expanded rank-specific codebooks. Specifically, the per layer SINR computation based on hard-decision SIC rule, PMI and RI selection based on maximizing weighted sum layer capacity, codeword ordering, per codeword SINR combing based on MIESM, and rate matching based on SINR thresholds can be done in the same way as presented above for this virtual SU-MIMO system.

From the foregoing, it can also be appreciated that the inventive link adaptation is superior to prior works heretofore. The proposed link adaptation scheme exploits the turbo SIC decoding performance by being conservative in assigning MCS to the 1$^{st}$ decoded UE and aggressive in assigning MCS to the 2$^{nd}$ decoded UE. The inventive link adaptation determines the PMI and rank by taking into account the turbo SIC receiver performance. The inventive rate adaptation decouples the MCS assignment for the two co-scheduled UEs. Thus, it can be easily scaled to the case when more than two UEs can be co-scheduled. The inventive rate adaptation can be easily extended to the scenario that allows partially overlapped resource allocation. For example, such a situation may exist in LTE-A uplink.

Additional advantages and benfits of the inventive link adaptation (including MCS selection, rank adaptation and PMI selection) includes: 1) the inventive link adaptation scheme results in higher spectrum efficiency performance for the system with turbo SIC receiver compared to other existing methods; 2) the inventive link adaptation has low complexity; 3) The proposed algorithm accurately captures and predicts the turbo SIC performance.; 4) the inventive link adaptation can use any ordering rule; 5) the inventive adaptation is scalable to the case when more than two UEs can be co-scheduled; and 6) inventive adaptation can be easily extended to the scenario that allows partially overlapped resource allocation. For example, such situation may exist in LTE-A uplink; and 7) the inventive rate adaptation has theoretically optimal properties for the frequency flat channel.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for link adaptation for an LTE/LTE-A uplink with a turbo SIC receiver, said method comprising the steps of:
   determining a precoding matrix index PMI and rank index RI selection for an LTE/LTE-A uplink when precoding of said uplink is enabled, responsive to channel state information of a subcarrier in said uplink;
   determining a decoding order for codewords in said uplink i) when said precoding of said uplink is not enabled and ii) if needed when said precoding of said uplink is enabled;
   performing modulation and coding scheme MCS assignment for said uplink based on a hard decision successive interference cancellation SIC rule without intra-codeword CW cancelation or a partial hard decision SIC rule with intra-CW cancellation, responsive to said determined PMI and RI selection; and
   influencing data transmission in said uplink for detection by a turbo successive interference cancellation SIC receiver, responsive to said MCS assignment.

2. The method of claim 1, wherein said determining a PMI and RI selection comprises a per-layer signal-to-noise-interference-ratio SINR determination for finding a PMI for each respective rank of said RI.

3. The method of claim 1, wherein said performing MCS assignment on said uplink comprising determining a linear minimum mean-square error LMMSE for a first decoded codeword in said uplink influencing said MCS for said first decoded codeword and determining a secondary user SINR for a second decoded codeword in said uplink for influencing said MCS for said second decoded codeword.

4. The method of claim 1, wherein said rank index RI is optimized according to $$RI = \arg\max_{R \in [1,\ldots,R_{max}]} v(R),$$

where R is a given rank, v(R) is a weighted sum metric assuming sub-band PMIs and R$_{max}$ denotes a maximum supported rank.

5. The method of claim 4, wherein said weighted sum metric comprises $$v(R) = \sum_{r=1}^{R} \varphi(r) \log_2(1 + SINR^{(r)}),$$

where SINR$^{(r)}$ is a post-discrete Fourier transform DFT SINR of an r-th layer and φ(r) denotes a layer-dependent weighting factor.

6. The method of claim 1, wherein for a wideband said precoding a wideband precoding matrix index PMI for R-layer transmission comprises $$PMI = \arg\max_{q \in [1,\ldots,Q]} \sum_{r=1}^{R} \varphi(r)\log_2(1 + SINR_q^{(r)}),$$

where R is a given rank, $SINR_q^{(r)}$ denotes a wideband post-DFT SINR for an r-th layer upon selecting a q-th precoding matrix, and $\varphi(r)$ denotes a layer-dependent weighting factor.

7. The method of claim 1, wherein said step of determining a PMI and RI selection comprises obtaining a per codeword SINR, for a rank R=2 (2-layer) transmission per codeword SINR being a per layer SINR because of a on-to-one codeword-to-layer mapping relationship and for a rank R>2, per codeword SINR being obtainable based on a codeword-to-layer mapping relationship.

8. The method of claim 1, wherein said step of performing modulation and coding scheme MCS assignment for said uplink comprises choosing for a first decoded codeword in said uplink a largest MCS index i* that a minimum mean square MMSE SINR can support and choosing for a second decoded codeword in said uplink a largest MCS index j* that SU SINR can support.

9. The method of claim 8, wherein said step of performing modulation and coding scheme MCS assignment comprises determining a linear minimum square error LMMSE SINR for a first decoded codeword in said uplink and determining a single user SU SINR for a second decoded codeword in said uplink.

10. The method of claim 8, wherein said largest MCS index i* is given by i*=max i s.t. $\gamma_{mmse}^{(1)} \geq SINR_{thr1}(i)$; and said largest MCS index j* is given by j*=max s.t. $\gamma_{su}^{(2)} \geq SINR_{thr2}(j)$; where $SINR_{thr1}$ and $SINR_{thr2}$ are respectively SINR threshold vectors for said first decoded codeword and said second decoded codeword respective MCS assignments.

11. The method of claim 8, said step of performing modulation and coding scheme MCS assignment for said uplink comprises obtaining two SINR threshold vectors for said MCS assignment with one SINR threshold vector being a minimum SINR level that ensures a target BLER=0.1 for said MCS with a first index and another SINR threshold vector denoting an SINR value at a transition point such that said MCS with said first index maximizing effective throughput for all SINRs in a predetermined range.

12. A method for link adaptation for an LTE/LTE-A uplink with a turbo SIC receiver, said method comprising the steps of:
   i) determining a precoding matrix index PMI and rank index RI selection for an LTE/LTE-A uplink when precoding of said uplink is enabled, responsive to channel state information of a subcarrier in said uplink, said PMI and RI being determinable for both sub-band precoding and wideband precoding with codeword decoding being jointly determinable with PMI and RI selection;
   ii) determining a decoding order for codewords in said uplink a) when said precoding of said uplink is not enabled and b) if needed when said precoding of said uplink is enabled, responsive to step i), said decoding order being one of enforced from an upper layer by a scheduler or determined on-the-fly, in case of a proportional fairness said scheduler an ordering being to set said decoding order as a reverse order of weights of said proportional fairness or said decoding order being jointly determined with said determining of said PMI and rank selection;
   iii) selecting modulation and coding scheme MCS indices on said uplink according to a hard decision successive interference cancellation signal-to-interference-noise-ratio SIC SINR or a partial hard decision SIC SINR, responsive to step ii), for a codeword in said uplink decoded first, said MCS being assigned according to its minimum mean square error MMSE-SINR and for a codeword decoded second, said MCS being assigned according to its single-user SINR; and
   iv) conveying said MCS indices to scheduling at a base station of said uplink for being applied to data transmission in said uplink.

* * * * *